(12) United States Patent
Srinivasa et al.

(10) Patent No.: US 11,140,745 B2
(45) Date of Patent: Oct. 5, 2021

(54) WLAN TRIGGER FRAME PADDING FOR MEETING MINIMUM PROCESSING TIME REQUIREMENT OF RECEIVER

(71) Applicant: NXP USA, Inc., Austin, TX (US)

(72) Inventors: Sudhir Srinivasa, Los Gatos, CA (US); Hongyuan Zhang, Fremont, CA (US); Sri Varsha Rottela, Visakhapatnam (IN); B Hari Ram, Chennai (IN); Christian Raimund Berger, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 51 days.

(21) Appl. No.: 16/686,150

(22) Filed: Nov. 17, 2019

(65) Prior Publication Data
US 2020/0163152 A1 May 21, 2020

Related U.S. Application Data

(60) Provisional application No. 62/769,351, filed on Nov. 19, 2018.

(51) Int. Cl.
*H04W 4/00* (2018.01)
*H04W 80/02* (2009.01)
(Continued)

(52) U.S. Cl.
CPC .......... *H04W 80/02* (2013.01); *H04L 1/0008* (2013.01); *H04L 1/0063* (2013.01); *H04L 1/065* (2013.01); *H04L 1/0643* (2013.01); *H04W 84/12* (2013.01)

(58) Field of Classification Search
CPC ............... H04W 72/042; H04W 76/27; H04W 72/0446; H04W 80/02; H04W 84/12;
(Continued)

(56) References Cited

U.S. PATENT DOCUMENTS

| 10,904,920 B1* | 1/2021 | Noh | H04W 72/04 |
| 2016/0099796 A1* | 4/2016 | Yang | H04L 27/12 |
| | | | 714/776 |

(Continued)

OTHER PUBLICATIONS

P802.11axTM/D3.3—IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, Amendment Enhancements for High Efficiency WLAN, pp. 1-730, Dec. 2018.

IEEE Std 802.11™, "IEEE Standard for Information technology—Telecommunications and information exchange between systems—Local and metropolitan area networks—Specific requirements, Part 11: Wireless LAN Medium Access Control (MAC) and Physical Layer (PHY) Specifications", section 19.3.11.75, pp. 2379-2381, year 2016.

(Continued)

*Primary Examiner* — Atique Ahmed (57) ABSTRACT

A WLAN Access Point (AP) includes a MAC processor and a PHY processor. The MAC processor is configured to generate a trigger frame including user information fields destined to respective STAs, and a padding field including one or more padding bits, to determine a number of padding bits that, after the trigger frame including the padding bats being encoded for transmission, satisfy a processing-time constraint imposed by the STAs, and to insert the determined number of padding bits in the padding field. The PHY processor is configured to generate a packet from the trigger frame, including encoding the trigger frame in accordance with an ECC, into one or more code words whose length depends on a number of padding bits in the padding field, to generate multiple modulated symbols from the one or more code words of the packet, and to transmit the modulated symbols to the STAs.

14 Claims, 4 Drawing Sheets

(51) Int. Cl.
*H04L 1/00* (2006.01)
*H04L 1/06* (2006.01)
*H04W 84/12* (2009.01)

(58) Field of Classification Search
CPC ... H04L 5/0053; H04L 1/1812; H04L 1/0008; H04L 1/0063; H04L 1/065; H04L 1/0643
See application file for complete search history.

(56) References Cited

U.S. PATENT DOCUMENTS

| | | | | |
|---|---|---|---|---|
| 2016/0302104 | A1* | 10/2016 | Bharadwaj | H04L 1/1685 |
| 2016/0345202 | A1 | 11/2016 | Bharadwaj et al. | |
| 2017/0086172 | A1* | 3/2017 | Dinan | H04W 72/0453 |
| 2017/0170932 | A1* | 6/2017 | Chu | H04W 72/121 |
| 2017/0171851 | A1* | 6/2017 | Lan | H04W 72/048 |
| 2017/0303280 | A1* | 10/2017 | Chun | H04W 72/0453 |
| 2018/0123832 | A1* | 5/2018 | Blanksby | H04L 1/00 |
| 2018/0270699 | A1* | 9/2018 | Babaei | H04W 72/1284 |
| 2019/0349232 | A1* | 11/2019 | Cariou | H04L 5/0053 |
| 2020/0322008 | A1* | 10/2020 | Lomayev | H04B 7/0678 |

OTHER PUBLICATIONS

IEEE Std 802.11ac™, IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, pp. 1-425, year 2013.

IEEE Standard 802.11a (2003), "IEEE Standard for Telecommunications and Information Exchange Between Systems—LAN/MAN Specific Requirements—Part 11: Wireless Medium Access Control (MAC) and physical layer (PHY) specifications: High Speed Physical Layer in the 5 GHz band", pp. 1-92, Jun. 2003.

IEEE P802.11n, IEEE Standard for information technology—Telecommunications and information exchange between systems—Local and metropolitan area networks—Specific requirements, Part 11: Wireless LAN Medium Access Control (MAC) and Physical Layer (PHY) specifications, Amendment 5,: Enhancements for higher Throughput, pp. 1-536, year 2009.

* cited by examiner

WLAN TRIGGER FRAME PADDING FOR MEETING MINIMUM PROCESSING TIME REQUIREMENT OF RECEIVER

CROSS-REFERENCE TO RELATED APPLICATIONS

This application claims the benefit of U.S. Provisional Patent Application 62/769,351, filed Nov. 19, 2018, whose disclosure is incorporated herein by reference.

FIELD OF THE DISCLOSURE

The present disclosure relates generally to wireless communication, and particularly to methods and systems for padding a Trigger frame for meeting minimum processing time requirement of the receiver.

BACKGROUND

Some Wireless Local-Area Network (WLAN) communication systems support multi-user schemes for communicating with multiple users simultaneously. A simultaneous uplink transmission from multiple client stations may be initiated by an Access Point (AP) sending to these client stations a suitable Trigger frame. The Trigger frame should be processed by the recipient receivers so that the client stations can respond with a simultaneous uplink transmission. The AP should control the length of the Trigger frame to allow sufficient processing time at the receivers of the client stations. Uplink multi-user operation in WLANs is specified, for example, in a draft IEEE 802.11ax standard, entitled "P802.11ax™/D3.3—IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, Amendment Enhancements for High Efficiency WLAN," 2018, which is incorporated herein by reference.

The description above is presented as general overview of related art in this field and should not be construed as an admission that any of the information it contains constitutes prior art against the present patent application.

SUMMARY

An embodiment that is described herein provides a Wireless Local-Area Network (WLAN) Access Point (AP), including a Medium Access Control (MAC) processor and a physical layer (PHY) processor. The MAC processor is configured to generate a trigger frame including at least (i) one or more user information fields destined to one or more respective WLAN client stations (STAs), and (ii) a padding field including one or more padding bits, to determine a number of padding bits required that, after being inserted into the padding field and the trigger frame being encoded for transmission, satisfy a processing-time constraint imposed by the STAs, and to insert the determined number of padding bits required in the padding field. The physical layer (PHY) processor is configured to generate a packet from the trigger frame, including encoding the trigger frame containing the padding field in accordance with an Error Correction Code (ECC), into one or more Code Words (CWs) having a CW length that depends on a number of padding bits in the padding field, to generate multiple modulated symbols from the one or more CWs of the packet, and to transmit the modulated symbols to the STAs.

In some embodiments, the MAC processor is configured to receive, before generating the trigger frame, multiple processing-time constraint values from one or more respective STAs that participate in a simultaneous uplink transmission to be triggered by the trigger frame, and to determine the number of padding bits required based on a longest value among the multiple received processing-time constraint values. In other embodiments, the MAC processor configured to adjust one or more of the received processing-time constraint values, before selecting the longest value, based on respective locations of the user information fields of the STAs in the Trigger frame.

In an embodiment, the PHY processor is configured to encode the trigger frame with the ECC applying a Binary Convolutional Code (BCC). In another embodiment, the MAC processor is configured to determine the number of padding bits required, by calculating a partial number of padding bits required for reaching a far boundary of a symbol to which a last BCC encoded bit of a last user information field is mapped. In yet another embodiment, the PHY processor is configured to encode the trigger frame with the ECC applying a Low-Density Parity-Check (LDPC) code. In yet further another embodiment, the MAC processor is configured to determine the number of padding bits required, by calculating a partial number of padding bits required for reaching a far boundary of a symbol to which a last encoded bit of a LDPC code word that encodes a last bit of a last user information field, is mapped.

In some embodiments, the MAC processor is configured to determine the number of padding bits required, by evaluating an expected modification to an encoding scheme applied using the ECC caused by adding the padding bits, the modification changes a length of the trigger frame. In other embodiments, the processing-time constraint is indicative of an additional processing time required by a STA, and the MAC processor is configured to determine a partial number of the padding bits required, independently of the processing-time constraint.

In an embodiment, the MAC processor is configured to determine the number of padding bits required using an iterative process that iteratively increases the number of padding bits required until the processing-time constraint is met. In another embodiment, the AP supports a Space-Time Block Coding (STBC) mode of operation, and the MAC processor is configured to determine the number of padding bits required depending on the STBC mode.

There is additionally provided, in accordance with an embodiment that is described herein, a method for communication, including, in a Wireless Local-Area Network (WLAN) Access Point (AP) that includes a Medium Access Control (MAC) processor, and a physical layer (PHY) processor, generating by the MAC processor a trigger frame including at least (i) one or more user information fields destined to one or more respective WLAN client stations (STAs) and (ii) a padding field including one or more padding bits. A number of padding bits required that, after being inserted into the padding field and the trigger frame being encoded for transmission, satisfy a processing-time constraint imposed by the STAB, is determined by the MAC processor and the determined number of padding bits required is inserted in the padding field. A packet is generated from the trigger frame, by the PHY processor, including encoding the trigger frame containing the padding field in accordance with an Error Correction Code (ECC), into one or more Code Words (CWs) having a CW length that depends on a number of padding bits in the padding field multiple modulated symbols are generated by the PHY processor from the one or more CWs of the packet, and the modulated symbols are transmitted to the STAB.

The present disclosure will be more fully understood from the following detailed description of the embodiments thereof, taken together with the drawings in which:

DETAILED DESCRIPTION OF EMBODIMENTS

Embodiments that are described herein provide methods and systems for padding a Trigger frame destined to multiple receivers, by determining the number of padding bits required in the Trigger frame for meeting minimum processing time requirement of the receiver. The Trigger frame may be broadcasted by a transmitter of a Wireless LAN (WLAN) device for initiating simultaneous uplink transmissions by client stations. Determining the number of padding bits in the Trigger frame is based on time duration reported by each client station, required by that client station for processing the Trigger frame. The Trigger frame length may be controlled by properly selecting the number of padding bits. When the number of padding bits is too small, a simultaneous uplink transmission may fail because at least one of the client stations receiving the Trigger frame will not be ready on time. On the other hand, using a larger than necessary number of padding bits reduces bandwidth usage efficiency.

In some WLAN communication systems, an Access Point (AP) communicates with one or more WLAN client stations (STAs). The transmission direction from the AP toward the STAs is referred to as Downlink (DL), whereas the transmission direction from the STAs toward the AP is referred to as Uplink (UL). The IEEE 802.11ax standard cited above, specifies DL and UL transmissions using Orthogonal Frequency-Division Multiple Access (OFDMA) techniques in which subsets of subcarriers, referred to as Resource Units (RUs) are allocated for the transmissions.

The IEEE 802.11ax standard supports coordinated UL transmissions from multiple STAs, initiated by the AP broadcasting a special type of packet containing a Trigger frame. The Trigger frame includes information that the STAs need for generating the response UL transmissions, such as duration of the UL packets, RU allocation, modulation method, payload length, and the like.

Each of the STAs receiving the Trigger frame process the Trigger frame to extract the information it needs for generating the UL response transmission. Since the STAs may have different processing and storage capabilities, different STAs may require different time-durations for processing the Trigger frame and generating a response packet.

In some embodiments, before broadcasting the Trigger frame, the AP receives from multiple STAs that participate in a simultaneous UL transmission, respective processing-time requirements, from which the AP derives a common processing-time constraint, e.g., based on the longest time requirement reported by the STAs. By inserting one or more padding bits in the Trigger frame, the transmission duration of the Trigger frame increases, which allows longer processing time for the STAs. For efficient usage of the communication link, however, it is desirable to add the smallest number of padding bits that still satisfies the processing-time constraint.

Determining the number of padding bits required is not trivial. The Trigger frame is typically encoded in accordance with an Error Correction Code (ECC) into one or more Code Words (CWs). Adding padding bits to the Trigger frame may, however, result in modifying the ECC encoding scheme applied to the Trigger frame including the padding bits, which may result in violating the processing-time constraint. For example, the encoding scheme may depend on padding when the code word length depends on the frame length and therefore also on the number of padding bits added. As another example, the number of padding bits may affect a puncturing and/or shortening scheme applied as part of the encoding scheme.

In some embodiments, the AP comprises a Medium Access Control (MAC) processor, and a Physical Layer (PHY) processor. The MAC processor generates a Trigger frame comprising at least (i) one or more user information fields destined to one or more respective STAs and (ii) a padding field comprising one or more padding bits. The MAC processor determines the number of padding bits required that, after being inserted into the padding field and the trigger frame being encoded for transmission using an ECC, satisfy the processing-time constraint imposed by the STAs. The MAC processor inserts the determined number of padding bits required in the padding field. The PHY processor generates a packet from the Trigger frame, including encoding the trigger frame containing the padding field in accordance with the underlying ECC. The PHY processor generates multiple modulated symbols from the one or more CWs of the packet and transmits the modulated symbols to the STAs.

In some embodiments, before generating the Trigger frame for triggering simultaneous UL transmissions by client stations, the MAC processor receives multiple processing-time constraint values from one or more respective STAs and determines the number of padding bits required based on a longest processing-time constraint value among the multiple received processing-time constraint values.

In some embodiments, the PHY processor is configured to encode the Trigger frame with a Binary Convolutional Code (BCC). In such embodiments, the MAC processor determines the number of padding bits required, by calculating a partial number of padding bits required for reaching a far boundary of a symbol to which a last BCC encoded bit of a last user information field is mapped.

In other embodiments, the PHY processor is configured to encode the Trigger frame with a Low-Density Parity-Check (LDPC) code. In these embodiments, the MAC processor determines the number of padding bits required, by calculating a partial number of padding bits required for reaching a far boundary of a symbol to which a last encoded bit of a LDPC code word that encodes a last bit of a last user information field, is mapped.

In an embodiment, the MAC processor determines the number of padding bits required, by evaluating an expected modification to an encoding scheme applied using the ECC, e.g., due to omitting from transmission one or more encoded bits in the one or more CWs. Omitting encoded bits may result, for example, by applying to the encoded bits puncturing, shortening or both.

In some embodiments, the processing-time constraint is indicative of an additional processing time required by a STA, and the MAC processor determines a partial number of the padding bits required, independently of the processing-time constraint. The partial number of padding bits may be required for reaching a certain symbol, e.g., as described above. In some embodiments, the MAC processor determines the number of padding bits required using an iterative process that iteratively increases the number of padding bits required until the processing-time constraint is met. The number of padding bits added may be the same or different across the iterations.

In some embodiments, the AP supports a Space-Time Block Coding (STBC) mode of operation, in which the AP transmits multiple copies of a data stream via multiple antennas. In such embodiments, the MAC processor may determine the number of padding bits required, depending on whether the AP operates in the STBC mode.

In the disclosed techniques, padding bits are added to a Trigger frame for meeting processing-time constraints imposed by client STAs. The Trigger frame is destined to multiple client stations that in response to the Trigger frame transmit simultaneous UL transmissions. Several methods for calculating a number of padding bits sufficient for meeting the constraint are described. Some closed techniques take into consideration, directly or indirectly, possible modification to the encoding scheme applied due to the added bits. The different methods may result in different accuracy in evaluating the minimum number of padding bits required.

Figure 1:
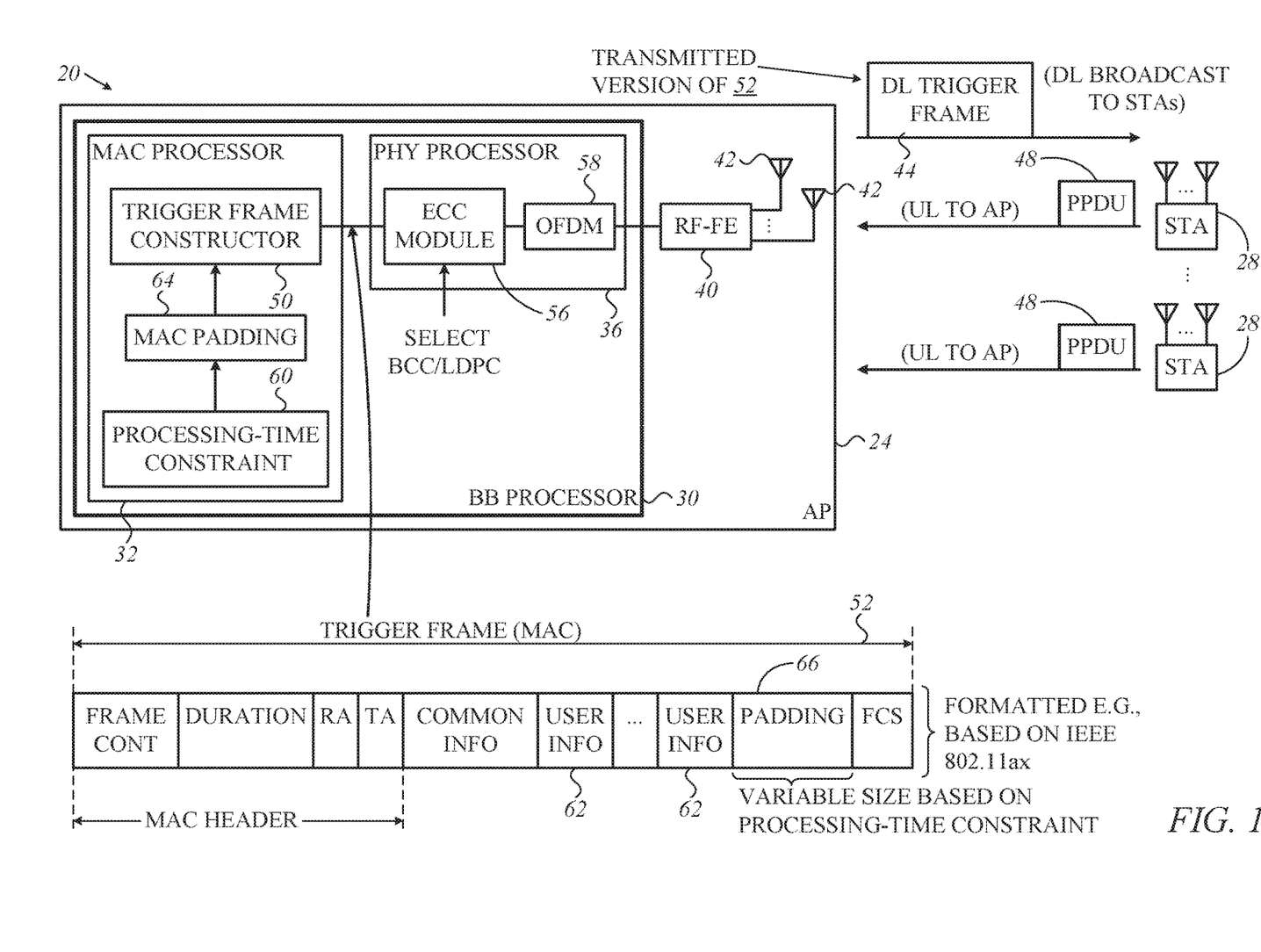
FIG. 1 is a block diagram that schematically illustrates a wireless communication system in which an Access Point (AP) pads a Trigger frame that triggers simultaneous uplink transmissions by multiple client stations (STAs), for meeting a processing-time constraint of the client stations (STAs), in accordance with an embodiment that is described herein.

FIG. 1 is a block diagram that schematically illustrates a wireless communication system 20 in which an Access Point (AP) 24 pads a Trigger frame that triggers simultaneous uplink transmissions by multiple client stations (STAs) 28, for meeting a processing-time constraint of the client stations (STAs), in accordance with an embodiment that is described herein.

Communication system 20 comprises, in an example embodiment, a Wireless—Local Area Network (WLAN) communication system operating in accordance with the IEEE 802.11 family of standards, such as, for example, the IEEE 802.11ax standard cited above.

AP 24 comprises a Base Band (BB) processor 30, which comprises a MAC processor 32 and a PRY processor 36. Each of MAC processor 32 and PRY processor 36 comprises various elements, as will be described below. In the description that follows, MAC processor 32 is also referred to herein as a "MAC module," and PHY processor 36 is also referred to herein as a "PHY module." AP 24 further comprises a Radio-Frequency Front-End (RE-FE) 40 coupled to one or more antennas 42. In some embodiments, AP 24 processes data in a layered scheme in which MAC processing is followed by PHY processing in the downlink direction, and PHY processing is followed by MAC processing in the uplink direction. MAC module 32 and PHY module 36 are also referred to herein as a "MAC processor" and a "PHY processor," respectively.

In the description that follows, data units processed at the MAC layer are referred to as "frames" whereas data units processed at the PHY later are referred to as "packets." In the IEEE 802.11 family of standards, a frame processed at the MAC layer, e.g., using MAC module 32, is referred to as a MAC Protocol Data Unit (MPDU). A packet processed at the PHY layer, e.g., by PHY module 36, is referred to as a PLCP Protocol Data Unit (PPDU). The PLCP refers to as a Physical Layer Convergence Procedure (PLCP) sublayer of the PHY layer. The PLPC sublayer handles data in the form of a PLCP Service Data Unit (PSDU), which is equivalent to the MPDU, and generates a PPDU by appending a preamble and PHY header information to the PSDU. The preamble typically is used for synchronization and channel estimation at the receiver. The preamble also contains information required for processing the packet, such as the Modulation and Coding Scheme (MCS) used, the number Nss of spatial streams, Bandwidth information and the like.

In communication system 20, AP 24 communicates wirelessly with one or more STAs 28 in its vicinity. In some embodiments, e.g., as specified in the IEEE 802.11ax standard, AP 24 initiates simultaneous uplink transmissions by multiple STAs 28, by broadcasting a DL Trigger frame 44 in the downlink direction. AP 24 typically transmits DL Trigger frame 44 within a downlink PPDU (not shown). In response to receiving the DL Trigger frame, STAs 28 that participate in the UL transmission transmit respective uplink PPDUs 48, simultaneously. DL Trigger frame 44 carries information that the STAs use for generating uplink PPDUs 48, as will be described below.

In some embodiments, MAC module 32 comprises a trigger frame constructor 50 that generates a MAC Trigger frame 52. Note that DL Trigger frame 52 is the transmitted version of MAC Trigger frame 52. In the example of FIG. 1, trigger frame constructor 50 generates MAC Trigger frame 52 in accordance with a trigger frame format specified in the IEEE 802.11ax standard. In some embodiments, trigger frame constructor 50 supports generating various types of frames, at the MAC layer.

MAC module 32 provides Trigger frame 52 to PRY module 36, which comprises an Error Correction (ECC) module 56 and an Orthogonal Frequency-Division Multiplexing (OFDM) module 58. In some embodiments, ECC module 56 supports multiple selectable ECC schemes. In the example of FIG. 1, FCC module 56 supports a Binary Convolutional Code scheme and a Low-Density Parity-Check (LDPC) coding scheme. Alternatively, any other suitable ECC scheme can also be used. BCC and LDPC schemes that are applicable in PHY module 36 are specified, for example, in the IEEE 802.11ax standard. The actual ECC scheme employed typically depends on various parameters such as the number of payload bits to be encoded, the transmission data rate, a modulation scheme used and the like.

In the downlink direction, PHY module 36 receives MAC frames, e.g., such as MAC Trigger frame 52, from MAC module 32 for processing. The PHY module typically appends information to the MAC layer frame to produce a packet that includes headers and a payload part. The ECC module 56 encodes the packet payload (the payload part comprises, for example, MAC Trigger frame 52) in accordance with the underlying ECC scheme selected. OFDM module 58 receives a packet with an encoded payload and maps the packet bits into a sequence of OFDM symbols. In some embodiments, the OFDM module first maps the packet bits into respective points in a predefined constellation, e.g., a Quadrature Amplitude Modulation (QAM) constellation, and then maps the constellation points into the OFDM symbols. In the present context, mapping between bits and symbols is also referred to as a "modulation" operation. In an embodiment, OFDM module 58 further converts the OFDM symbols to an analog signal using a Digital to Analog Converter (DAC) (not shown). RF-FE 40 up-converts the analog signal to a desired RF band and transmits the up-converted signal via one or more antennas 42.

In the uplink direction, RF-FE 40 receives RF signals, via antennas 42, from one or more STAs 28. The RF signals may carry, for example, PPDUs 48, encoded by the STA using an ECC that is decodable by ECC module 56. RF-FE 40 down-converts a received RF signal to baseband (or to some intermediate frequency) and converts the down-converted signal into digital form using an Analog to Digital Converter (ADC) (not shown). OFDM module 58 demodulates OFDM symbols carried to the down-converted signal to recover the encoded PPDUs. ECC module 56 decodes the ECC of the encoded PPDUs to recover the PPDUs data, which PHY module 36 provides to MAC module 32.

The MAC and PHY downlink and uplink processing described above have been simplified to include only tasks required for understanding the disclosed techniques, for the sake of clarity. In practice, the MAC module and the PHY module may apply various additional processing, tasks such as scrambling, interleaving, post-encoding padding and the like.

In some embodiments, MAC module 32 further comprises a processing-time constraint 60 and a MAC padding module 64. Processing-time constraint 60 holds a value (e.g., in a memory or register, not shown) that is indicative of the processing time required by the client STAs for processing DL Trigger frame 44. In some embodiments, before broadcasting a given Trigger frame (e.g., DL Trigger frame 44), AP 24 receives from STAs 28 that participate in the upcoming simultaneous transmission, respective processing-time durations of these STAs. In an embodiment, to allow sufficient processing time at all participating STAs, MAC module 32 calculates the value of processing-time constraint 60 as the longest duration among the multiple processing time durations reported.

Based on processing-time constraint 60, MAC padding module determines the number of padding bits required for meeting the processing time requirement. Trigger frame constructor 50 inserts into a Padding field 66 of the MAC Trigger frame, the number of padding bits determined by MAC padding module 64. A MAC Trigger frame 52 constructed as described above and broadcasted as DL Trigger frame 44, is padded with a number of padding bits that allow sufficient processing time of the Trigger frame by each of the participating STAs, so that the STAs respond with a simultaneous UL transmission.

MAC Trigger frame 52 may be formatted in various ways. In the example of FIG. 1, MAC Trigger frame 52 is formatted in accordance with the IEEE 802.11ax specifications, in which the MAC Trigger frame comprises a MAC header comprising a Frame Control field, a Duration field, as well as RA and TA fields specifying addressing information. MAC Trigger frame 52 further comprises a Common Info field, one or more User Info fields 62, Padding field 66, and a Frame Check Sequence (FCS) field that serves as an error detection code. The MAC module calculates the value of the FCS field, e.g., by calculating a suitable Cyclic Redundancy Check (CRC) code over selected preceding fields of MAC Trigger frame 52. For example, the CRC calculation typically excludes the SERVICE bits field, which is added later by the PHY module.

The Common Info field comprises information addressed to all client STAs, such as the length (in microseconds) of uplink PPDUs 48, the bandwidth to be used for transmitting uplink PPDUs 48 and the like. Each User Info field 62 comprises information addressed to a specific STA, such as, RU allocation for that STA, ECC scheme used such as BCC or LDPC, and a Modulation and Coding Scheme (MCS). Padding field 66 contains one or more padding bits as calculated by MAC padding module 64. Alternatively, in case of zero padding, the Padding field may be omitted from MAC Trigger frame 52.

Note that by adding the padding bits, the transmission time of the MAC Trigger frame part following the User Info fields increase, which allows the client STAs more time for processing the DL Trigger frame and generating the uplink response PPDUs. Methods for determining the number of padding bits required for meeting processing-time constraint, will be described in detail below.

The format of MAC Trigger frame 52 in FIG. 1, which is based on the IEEE 802.11ax standard, is given by way of example, and other suitable formats for the MAC Trigger frame can also be used. In describing the format of MAC Trigger frame 52, details that are not relevant for understanding the disclosed techniques have been omitted for clarity.

The partition of tasks between the MAC and PHY modules is given by way of example. In alternative embodiments, other partitioning of tasks can also be used.

In response to receiving DL Trigger frame 44 that was broadcasted by AP 24, each STA 28 processes the received Trigger frame to extract information required for generating a respective uplink PPDU 48. Specifically, STA 28 extracts user-specific information from the relevant User Info field (62). Note that each STA may have different processing and storage capabilities, and therefore different STAs may require different time-durations for processing the Trigger frame and generating the response PPDU. Moreover, considering the sequence of the User Info fields 62 in MAC Trigger frame 52, the later a User Info field appears in the sequence, the less processing time remains for the corresponding STA compared to the other STAs.

For simultaneous uplink response, all the STAs are required to complete processing the DL Trigger frame and produce the PPDU on time, e.g., before uplink transmission of PPDUs 48 starts. In some embodiments, MAC module 32 determines processing-time constraint 60, based on the longest time requirement reported by the STAs participating in simultaneous UL transmission, for meeting the processing-time requirements of all STAs.

The configurations of communication system 20 and AP 24 of FIG. 1 are given by way of example, and other communication system and AP configurations can be used. Elements of the AP that are not mandatory for understanding the disclosed techniques have been omitted from the figure for the sake of clarity.

In the example AP configuration shown in FIG. 1, MAC processor 32 and PHY processor 36 are implemented as separate Integrated Circuits (ICs). In alternative embodiments, however, the MAC processor and PHY processor may be integrated on separate semiconductor dies in a single Multi-Chip Package (MCP) or System on Chip (SoC), (e.g., as part of BB processor 30) and may be interconnected by an internal bus.

In some embodiments, some or all of the elements of AP 24, such as MAC processor 32 and PHY processor 36 are implemented in hardware, such as using one or more Field-Programmable Gate Arrays (FPGAs) or Application-Specific Integrated Circuits (ASICs). In an alternative embodiment, certain elements such as one or more of trigger frame constructor 50, MAC padding module 64, ECC module 56 and OFDM module 58, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The IEEE 802.11ax standard cited above specifies, e.g., in section 27.5.3.2.3, a naïve padding scheme in which a time constraint denoted "MinTrigProcTime" can be configured to 0, 8 or 16 microseconds, or equivalently to 0, 2 or 4 OFDM symbols (assuming OFDM symbol duration of four microseconds). The naïve padding scheme is based on translating the value of MinTrigProcTime into number of padding bits by multiplying the corresponding number of OFDM symbols by the number of bits per symbol.

As will be described in detail below, in terms of OFDM symbols to which the encoded bits are mapped, "B_SYM" denotes the OFDM symbol of the PPDU that contains either (i) when a BCC scheme is used—the last encoded bit of the last User Info field (62), or (ii) when a LDPC scheme is used—the last encoded bit of the LDPC code word that encodes the last bit of the User info field. In the present context, the bits encoded using the BCC scheme are collectively considered as a single code word.

Unlike the naïve padding scheme, in the disclosed embodiments the padding length is determined while taking into consideration modifications to the encoding scheme caused by adding the padding bits, as explained herein. In the naïve padding scheme above, an assumption is made that B_SYM can be determined directly from the number of payload its to be encoded, prior to adding any padding bits. This assumption is however not always valid, e.g., when the underlying encoding scheme depends on the total number of payload bits to be encoded, including the padding bits. For example, an encoding scheme that applies puncturing removes some of the parity bits after encoding with an ECC, may result in a different location of B_SYM in the sequence of OFDM symbols compared to encoding without puncturing. As another example, in LDPC encoding into multiple code words, the code word length, the index of the code word that encodes the last bit of the last User Info field and B_SYM may depend on the total number of payload bits to be encoded, including padding bits whose number is not yet determined.

Padding schemes that improve over the naïve padding scheme above, will be described in detail below.

Figure 2A:
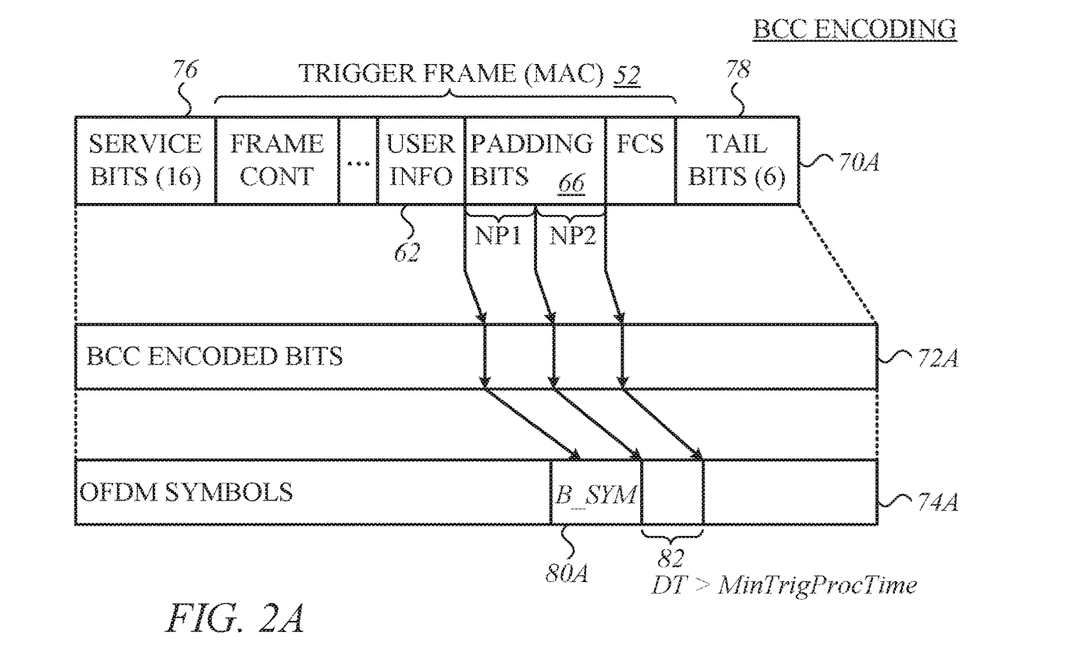
FIGS. 2A and 2B are diagrams that schematically illustrate a partial packet comprising a Trigger frame, and corresponding encoded its and OFDM symbols resulting from encoding the partial packet using a Binary Convolutional Code (BCC) or a Low-Density Parity-Check (LDPC) encoding scheme.
Figure 2B:
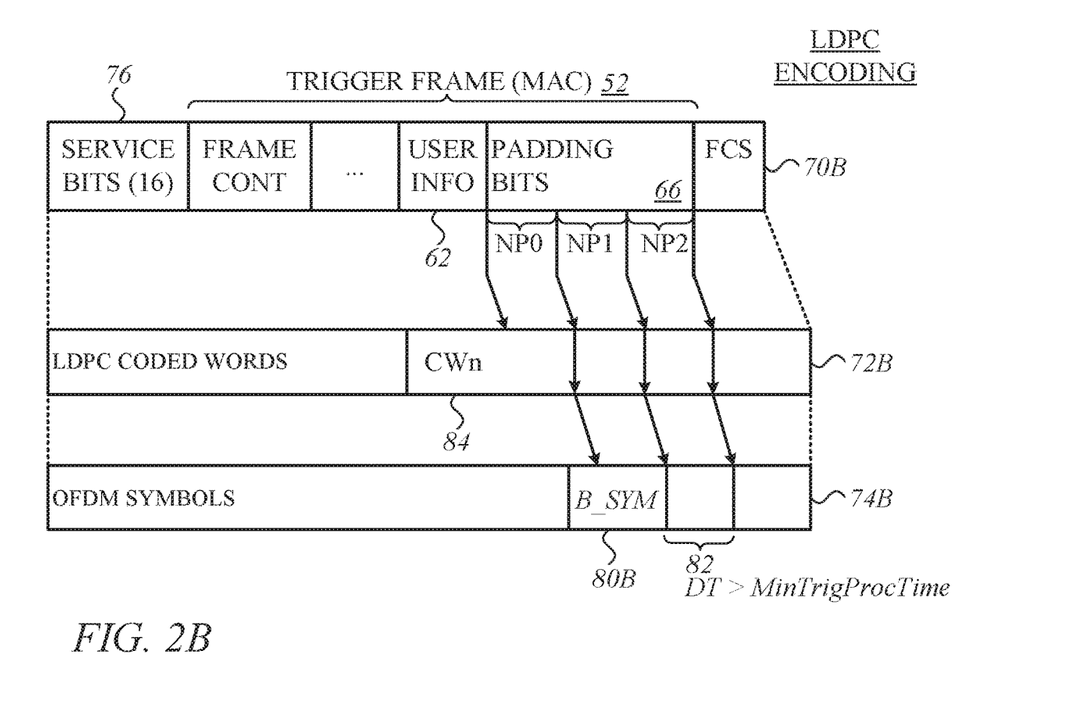

FIGS. 2A and 2B are diagrams that schematically illustrates a partial packet 70 comprising a Trigger frame 52, and corresponding encoded bits 72 and OFDM symbols 74 resulting from encoding the partial packets using a Binary Convolutional Code (BCC) or a Low-Density Parity-Check (LDPC) encoding scheme. Partial packets 70 may each be, for example, part of a PPDU comprising the MAC Trigger frame.

in FIG. 2A, partial packet 70A comprises a 16-bit SERVICE bits field 76, MAC Trigger frame 52 and a 6-bit TAIL field 78. Partial packet 70 is encoded using a BCC encoding scheme to produce BCC encoded bits 72A, which are mapped into OFDM symbols 74A. In some embodiments, the tasks of BCC encoding and mapping the encoded bits into the OFDM symbols are carried out using ECC module 56 and OFDM module 58, respectively.

As shown in FIG. 2A, the last bit of the last User Info field 62 of MAC Trigger frame 52 is mapped into an OFDM symbol 80A denoted B_SYM. Time period DT 82 denotes the additional time required for meeting the processing-time constraint DT>MinTrigProcTime. In some embodiments, the overall number of padding bits required for meeting the constraint may be split into subgroups containing respective numbers "NP1" and "NP2" of padding bits. The NP1 padding bits are required for reaching the far boundary of B_SYM 80A, and the NP2 padding bits are required for increasing the PPDU duration time by DT 82. The overall number of padding bits is given by the sum NPAD=NP1+NP2.

In FIG. 2B, partial packet 70B comprises a 16-bit SERVICE bits field 76 and MAC Trigger frame 52. Partial packet 70B is encoded using a LDPC scheme to produce encoded bits in the form of one or more LDPC code words 72B. The encoded bits of the LDPC code words are mapped into OFDM symbols 74B. In some embodiments, the tasks of LDPC encoding and mapping the encoded bits of the LDPC code words into the OFDM symbols are carried out using FCC module 56 and OFDM module 58, respectively.

As shown in FIG. 2B, the last bit of the last User Info field 62 of MAC Trigger frame 52 is encoded into the $n^{th}$ LDPC code word 84, denoted CWn. The last bit of CWn is mapped into OFDM symbol B_SYM 80B. DT 82 denotes the additional time required for meeting the processing-time constraint DT>MinTrigProcTime. In FIG. 2B, the overall number of padding bits required for meeting the constraint may be split into three subgroups as follows: "NP0" padding bits are required for reaching the far boundary of CWn, "NP1" padding bits are required for reaching the far boundary of B_SYM 80B, and "NP2" padding bits are required for increasing the PPDU duration time by DT 82. The overall number of padding bits is given by the sum NPAD=NP0+NP1+NP2.

Figure 3:
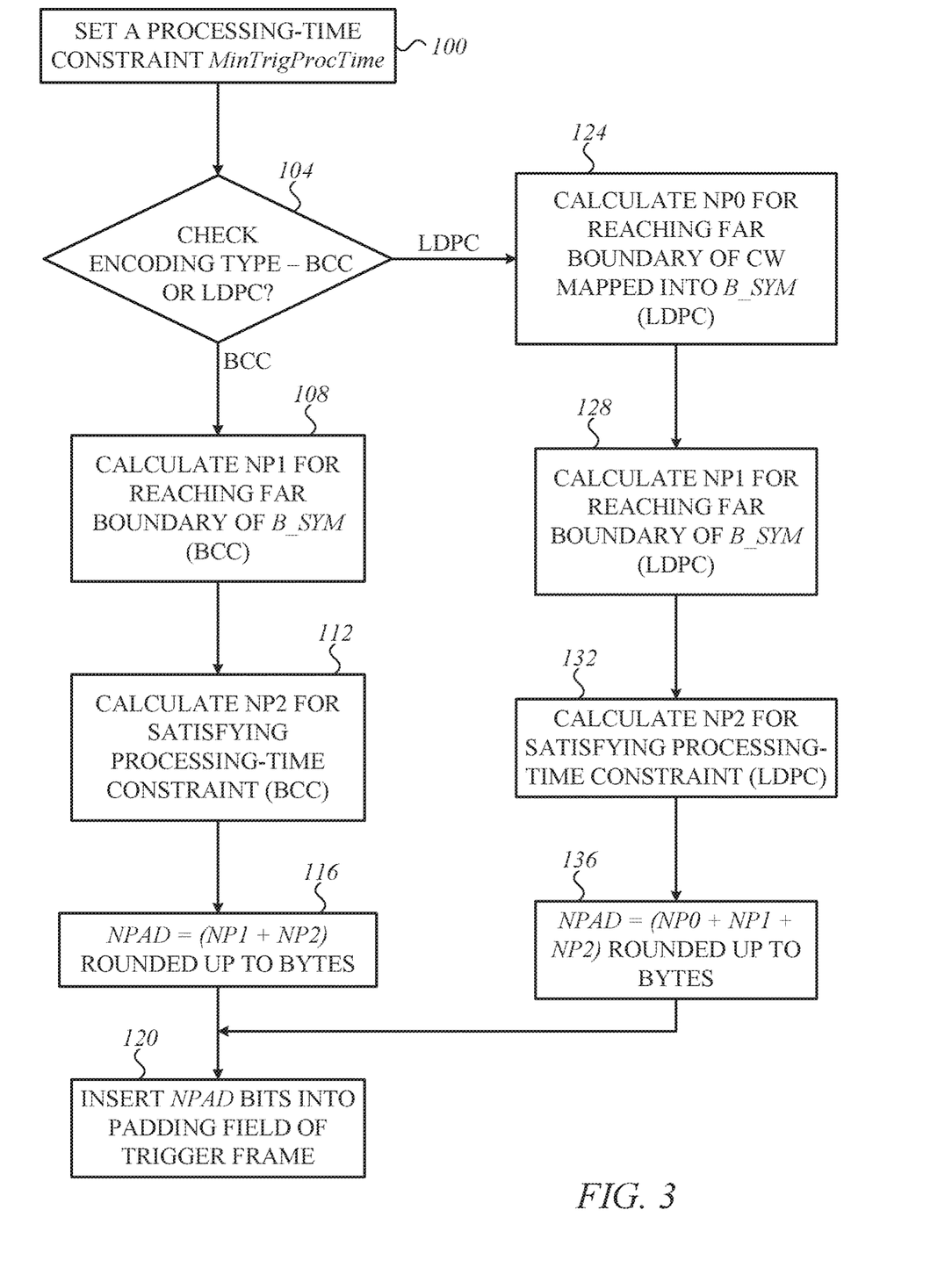
FIG. 3 is a flow chart that schematically illustrates method for padding a Trigger frame for meeting a processing-time constraint, in accordance with an embodiment that is described herein.

FIG. 3 is a flow chart that schematically illustrates a method for padding a Trigger frame for meeting a processing-time constraint, in accordance with an embodiment that is described herein. The method will be describe as executed by MAC module 32 of AP 24 of FIG. 1.

In the method of FIG. 3, partial numbers of padding bits corresponding to three respective subgroups of the total number of padding bits are denoted NP0, NP1 and NP2, as described above with reference to FIGS. 2A and 2B. As shown in FIGS. 2A and 2B, NP0 (only in FIG. 2B) comprises the number of padding bits required for reaching the far boundary of a relevant LDPC code word, NP1 (in FIGS. 2A and 2B) comprises the number of padding bits required for reaching the far boundary of B_SYM, and NP2 (in FIGS. 2A and 2B) comprises the number of padding bits required for increasing the PPDU time duration by MinTrigProcTime time units for meeting the processing-time constraint. The processing-time constraint MinTrigProcTime (whose value is common to STAs 28 participating in the simultaneous UL transmission) is typically specified in suitable time units such as microseconds, for example. Alternatively, the processing-time constraint may be specified in other types of units, as will be described further below.

The method begins with MAC module 32 determining processing-time constraint 60, at a time constraint setting operation 100. In some embodiments, before initiating a Trigger frame, AP 24 receives, from each of one or more STAs 28, a respective time requirement indicative of the processing time that STA requires for processing DL trigger frame 44. Based on the time requirements received from multiple STAs, MAC module 32 determines processing-time constraint 60, e.g., in accordance with the longest time requirement requested the STAs, in an embodiment.

In some embodiments, the processing time required by a given STA depends on the location of its USER INFO filed 62 in the Trigger frame (52). For example, a STA whose USER INFO field appears later the Trigger frame has less time for processing the Trigger frame including its own USER INFO field, compared to other STAs whose USER INFO fields appear earlier in the Trigger frame. In such embodiments, MAC module 32 determines processing-time constraint 60 based on both the time requirement requests received from the STAs, and the respective locations of the USER INFO fields in the Trigger frame. In an embodiment, the MAC processor is configured to adjust one or more of the time requirement requests received from the STAs, based on the respective locations of the USER INFO fields of the STAs in the Trigger frame, and to select, for example, the longest among the adjusted time requirement requests.

At an encoding type query operation 104, MAC module 32 checks whether ECC module is configured to apply a BCC or LDPC encoding scheme. When ECC module 56 is configured to a BCC scheme, the method proceeds to calculate the number of padding bits for BCC, starting at operation 108. Otherwise, the method proceeds to calculate the number of padding its for LDPC, starting at operation 124.

At an NP1 (BCC) calculation operation 108, MAC padding module 64 calculates NP1 for the BCC case. In the description and Equations given below, the following notations may be used:

"N_DBPS" denotes the number of data bits per OFDM symbol.

"N_CBPS" denotes the number of coded bits per OFDM symbol.

"B_SYM" denotes the index of B_SYM 80A or 80B within the sequence of OFDM symbols 74A or 74B.

"Nx" denotes the number payload bits of MAC Trigger frame 52 comprised within the fields—Frame control up to and including the last User Info field 62.

"Nsv" denotes the number of bits in SERVICE bits field 76. In the IEEE 802.11 family, Nsv comprises 16 bits.

"Ntl" denotes the number of bits in TAIL field 78. In the IEEE 802.11 family, Ntl comprises 6 bits.

For IEEE 802.11a/n packets, Non-High Throughput (Non-HT) and HT PPDUs, MAC padding module 64 calculates B_SYM as given by:

$$B\_SYM=\text{ceil}[(Nx+Nsv+Ntl)/N\_DBPS] \quad \text{Equation 1:}$$

and further calculates NP1 as:

$$NP1=B\_SYM \cdot N\_DBPS-(Nx+Nsv+Ntl) \quad \text{Equation 2:}$$

The "Ceil[ ]" operator in Equation 1 above (and in some Equations below) denotes a round-up operator to the nearest integer.

At an NP2 (BCC) calculation operation 112, the MAC padding module calculates NP2 as given by:

$$NP2=\text{ceil}(\text{MinTrigProcTime}/T\_SYM) \cdot N\_DBPS \quad \text{Equation 3a:}$$

wherein T_SYM denotes the OFDM symbol time duration (e.g., specified in microseconds). In Equation 3a, in accordance with the IEEE 802.11ax standard, T_SYM is assumed to be, e.g., 16 microseconds. Alternatively, e.g., in the IEEE 802.11a/n/ac standard, T_SYM is 4 microseconds, and NP2 is defined in terms of four-microsecond symbols, and calculated as:

$$NP2=\text{ceil}(\text{MinTrigProcTime}/4) \cdot N\_DBPS \quad \text{Equation 3b:}$$

Further alternatively, MAC padding module 64 may calculate NP2 using the Naïve padding scheme specified in the IEEE 802.11ax standard mentioned above.

At a BCC padding bits calculation operation 116, MAC padding module 64 calculates the total number of padding bits NPAD (rounded up to bytes) for the BCC case as given by:

$$NPAD=8 \cdot \text{ceil}[(NP1+NP2)/8] \quad \text{Equation 4:}$$

In some embodiments, e.g., when using PPDUs in accordance with the IEEE 802.11ac Very High Throughput (VHT) or the IEEE 802.11ax High Efficiency (HE) standards, the encoding flow comprises a phase of padding to the subsequent OFDM symbol (or OFDM segment in case of IEEE 802.11ax standard). In such embodiments, the calculation of NP1 above may be omitted, and the index of B_SYM and the pre-FEC padding factor (also denoted a_factor) are calculated by the physical layer based on the MPDU received. The number NP2 of padding bits is calculated by the MAC padding module as given above, e.g., in Equation 3a.

At a padding operation 120, trigger frame constructor 50 receives the overall number of padding bits NPAD from MAC padding module 64, and when NPAD>0 inserts NPAD padding bits into Padding field 66 of MAC Trigger frame 52. Trigger frame constructor 50 may insert the padding bits using any suitable method. In one embodiment, the trigger frame constructor inserts the padding bits by positioning the FCS field after a gap of NPAD bits relative to the last bit of User Info field 62. In some embodiments, the trigger frame constructor may set the binary values of the padding bits randomly or to predefined bit values. Alternatively, the trigger frame constructor leaves the NPAD padding bits with undetermined bit values.

As noted above, when at operation 104 the ECC module is configured to apply a LDPC scheme, the method proceeds to a NP0 calculation operation 124. At operation 124, MAC padding module 64 calculates NP0 for reaching the far boundary of a LDPC code word 84 whose last encoded bit is mapped into B_SYM 80B. In some embodiments, the MAC padding module calculates NP0 as:

$$NP0=\text{ceil}[(Nx+Nsrv)/(L_{LDPC} \cdot R)] \cdot (L_{LDPC} \cdot R)-(Nx+Nsrv) \quad \text{Equation 5:}$$

In Equation 5, $L_{LDPC}$ denotes the length (in bits) of the LDPC code words, R denotes the rate of the LDPC code used, and $(L_{LDPC} \cdot R)$ comprises the number of message bits in the LDPC code word.

In some embodiments, e.g., when processing PPDUs in accordance with the IEEE 802.11n/ac/ax standards, the LDPC code word length $L_{LDPC}$ used within the LDPC encoding flow depends on the total number of payload bits, including the padding bits. This may cause a problem, because MAC layer padding, e.g., as given in Equation 5, is based on $L_{LDPC}$, which depends on the number of padding bits that is not yet determined.

In one embodiment, to overcome this problem, the MAC padding module calculates NP0 using Equation 5 in which the $L_{LDPC}$ is selected to the maximum value supported, e.g., $L_{LDPC}=1944$ bits. In another embodiment, the MAC padding module selects a $L_{LDPC}$ value smaller than the maximum value supported, e.g., when the LDPC code word length is expected to remain unchanged after including the padding bits. This may be relevant for short frames (small Nx value) and/or when using small MCSs.

At an NP1 (LDPC) calculation operation 128, MAC padding module 64 calculates NP1 for the LDPC case. Let an intermediate number of bits, denoted Nb, be given by:

$$Nb=\text{ceil}[(Nx+Nsrv)/(L_{LDPC} \cdot R)] \cdot (L_{LDPC} \cdot R) \quad \text{Equation 6:}$$

For packets formatted in accordance with the IEEE 802.11n/ac standards, the MAC padding module calculates B_SYM 80B as:

$$B\_SYM = \text{ceil}[Nb/N\_DBPS] \qquad \text{Equation 7:}$$

and calculates NP1 as given by:

$$NP1 = B\_SYM \cdot N\_DBPS - Nb \qquad \text{Equation 8:}$$

For packets formatted in accordance with the IEEE 802.11ax standard, NP1 is required for padding up to the subsequent OFDM segment, which is given as part of the encoding flow.

In some embodiments, instead of calculating NP0 and NP1 separately, MAC padding module 64 calculates the sum of NP0 and NP1 as given by:

$$NP01 = \text{ceil}[Nb/Nbs] \cdot Nbs - Nb \qquad \text{Equation 9:}$$

wherein Nbs is given by:

$$Nbs = (N\_DPBS \cdot L_{LDPC} \cdot R) \qquad \text{Equation 10:}$$

At a LDPC NP2 calculation operation 132, the MAC padding module calculates NP2, for example, using the expression given in Equation 3a above.

At a LDPC padding bits calculation operation 136, the MAC padding module calculates the total number of padding bits NPAD (rounded up to bytes) for the LDPC case as given by:

$$NPAD = 8 \cdot \text{ceil}[(NP0+NP1+NP2)/8] \qquad \text{Equation 11:}$$

The method then proceed to operation 120 to insert NPAD padding bits to Padding field 66, as described above. Following operation 120, the method terminates.

In some embodiments, the encoding scheme applied using FCC module 56 includes puncturing, shortening or both, which reduces the length of the code word. In puncturing, some of the code word bits are not transmitted. In shortening, '0' bits are inserted in place of some data bits, and these bits are not transmitted. As a result of puncturing/shortening, the last symbol B_SYM, which contains the last user info field, may now be ($B_{SYM}+1$), hence the effective duration of the processing time required with respect to ($B_{SYM}+1$) is reduced, which may result in violating the processing-time constraint. In some embodiments, to prevent such a violation, the MAC padding module inserts additional padding bits to Padding field 66, for example, a number of additional padding bits corresponding to a time duration of one or more OFDM symbols.

In some embodiments, the number of puncturing/shortening bits and the LDPC code word length depend on the total number of payload bits, and therefore may change as a result of adding padding bits. For example, adding the padding bits may increase the number of shortening bits used during encoding, which may violate the processing-time constraint.

Let NP3 denote the number of padding bits required in addition to the NP0, NP1 and NP2 padding bits above. Let Ncw=Ncw0+1, wherein Ncw0 denotes the number of LDPC code words prior to adding the padding bits. In order to meet the processing-time constraint, the expression below should be satisfied:

$$L_{LDPC} \cdot R - \frac{L_{LDPC} \cdot R - (NP1 + NP2 + MP3)}{Ncw} < \qquad \text{Equation 12}$$
$$(NP0 + NP1 + NP2 + NP3)$$

In Equation 12, $L_{LDPC}$ denotes the LDPC code word length before adding the padding bits.

In some embodiments, based on Equation 12, the MAC padding module calculates NP3 using the expression:

$$NP3 > L_{LDPC} \cdot R - \frac{NP0}{\left(1 - \frac{1}{Ncw}\right)} - (NP1 + NP2) \qquad \text{Equation 13}$$

In these embodiments, the MAC padding module calculates NPAD at operation 136 above, as:

$$NPAD = NP0 + NP1 + NP2 + NP3 \qquad \text{Equation 14:}$$

In some embodiments, AP 24 is configured to operate in a Space-Time Block Coding (STBC) mode. In the STBC mode, AP 24 transmits multiple copies of a data stream via multiple antennas 42. In such embodiments, MAC padding module 64 calculates the partial numbers of padding bits NP0, NP1, NP2 and/or NP3 while taking into consideration whether the AP operates in the STBC mode, or not. Let STBCon=0/1 denote respective off/on configurations of the STBC mode. Equations for calculating NP0, NP1, NP2 and NP3 assuming a 16-bit SERVICE bits field are given herein:

$$N' = N\_DBPS \cdot (STBCon + 1) \qquad \text{Equation 15}$$

$$NP0 = \text{ceil}\left[\frac{(Nx+16)}{(L_{LDPC} \cdot R)}\right] \cdot (L_{LDPC} \cdot R) - (Nx + 16)$$

$$NP1 = \text{ceil}\left[\frac{NP0}{N'}\right] \cdot N' - NP0$$

$$NP2 = \left[\text{ceil}\left(\frac{MinTrigProcTime}{T\_SYM}\right) + 1\right] \cdot N\_DBPS$$

$$NP3 = \max\left\{0, \text{ceil}\left[\frac{L_{LDPC} \cdot R - \frac{NP0}{\left(1 - \frac{1}{Ncw}\right)} - (NP1 + NP2)}{N'}\right] \cdot N'\right\}$$

In the example of Equation 15 above, the calculation of NP2 includes extra padding bits corresponding to one additional OFDM symbol, compared to Equation 3a above. In some embodiments, for increasing the likelihood of meeting the processing-time constraint, MAC padding module 64 calculates the expressions in Equation 15 using the maximum code word length supported, e.g., $L_{LDPC}=1944$ bits.

Note that the ceil[·] operation in calculating NP2 may result in an additional LDPC codeword, which may affect the LDPC encoding flow, thereby possibly violating the processing-time constraint, as explained above. In some embodiments, to reduce the probability of violating the processing-time constraint, the MAC padding module increases NP2 by a number of bits corresponding to two OFDM symbols (instead of one OFDM symbol in Equation 15). The inventors discovered, using computer simulations, that even when inserting additional padding bits corresponding to two OFDM symbols, in certain modulation schemes such as MCS 10/11, violation of the processing-time constraint may occur. In some embodiments, when using these modulation schemes, the MAC padding module calculates NP2 by adding a number of padding bits corresponding to a number of three OFDM symbols.

In some embodiments, MAC padding module 64, selects one or more methods among the methods described above for calculating NP0 . . . NP3, based on parameters such as the length of the MAC Trigger frame, the MCS used and the like. Moreover, in some embodiments, the MAC module calculates NPAD by summing only part of the partial numbers of padding bits NP0 . . . NP3. For example, for meeting a processing-time constraint of 8 microseconds, or 16 microseconds with 80 MHz or 160 MHz channels, NPAD may be calculated as NPAD=NP0+NP2+NP3, i.e., omitting the calculation of NP1. In this embodiment, the calculation of NP2, e.g., using Equation 15 above, is modified to increase the number of padding bits by a number of bits corresponding to two OFDM symbols in case of 8 microseconds constraint and to three OFDM symbols in case of 16 microseconds constraint. In case of a 16 microseconds constraint and 20 MHz or 40 MHz channels, NPAD may be calculated as NPAD=NP0+NP1+NP2+NP3, wherein NP2 is extended by a number of padding bits corresponding to three OFDM symbols. In some embodiments, the MAC padding module adds a number of padding bits corresponding to three OFDM symbols for all cases, which simplifies the calculations above, but reduces the efficiency in using the available bandwidth. In some embodiments, when the bandwidth is configured to 80 MHz or to 160 MHz, the NP1 bits may be excluded.

The methods described above may result in a large overhead in terms of the additional number of padding bits corresponding to one or more OFDM symbols. Next an alternative method is described, for accurately determining the number of padding bits required for meeting the processing-time constraint. This alternative method will be described as executed by MAC padding module 64 as a series of operations.

In some embodiments, MAC padding module 64 sets an initial length value given by N_pld_init=Nx+16, and calculates a partial number of padding bits denoted N1 as:

$$N1 = N' \cdot \text{ceil}\left(\frac{\text{N\_pld\_init}}{N'}\right) - \text{N\_pld\_init} \quad \text{Equation 16}$$

wherein N'=N_DBPS·(STBCon+1). The MAC padding module calculates a partial number of padding bits N2 as given by:

$$N2 = \left[\text{ceil}\left(\frac{MinTrigProcTime}{T\_SYM}\right)\right] \cdot \text{N\_DBPS} \quad \text{Equation 17}$$

and calculates N_pld as:

N_pld=N_pld_init+N1+N2

The MAC padding module calculates an initial number of symbols Nsym_init and an initial number of available bits given by:

$$\text{Nsym\_init} = (STBC_{ON}) \cdot \text{ceil}\left(\frac{\text{N\_pld}}{N'}\right) \quad \text{Equation 19}$$

Navbits_init = N_CBPS·Nsym_init wherein N_CBPS denotes the number of coded bits per OFDM symbol. The MAC padding module calculates the number N_CW of LDPC code words and the code word length $L_{LDPC}$ as specified, for example, in section 19.3.11.7.5—LDPC PPDU encoding process, in "Part 11: Wireless LAN Medium Access Control (MAC) and Physical Layer (PHY) Specifications, IEEE Std 802.11™-2016," (A revision of IEEE Std 802.11-2012), and calculates the number of LDPC code words occupied the Padding field as:

$$\text{ncw\_cond} = \text{ceil}\left[\left(\text{ceil}\left(\frac{MinTrigProcTime}{T\_SYM}\right) + 1\right) \cdot \frac{\text{N\_CBPS}}{L_{LDPC}}\right] \quad \text{Equation 20}$$

The MAC module calculates:

Ncw'=(ncw_cond-N_CW+N_CW_nopad)

The parameter N_CW_nopad in Equation 21 denotes the number of LDPC code words assuming no pre-FEC padding, and payload length of N_pld_init bits.

The MAC padding module checks whether the condition 0<Ncw' is true, and if so, calculates a partial number of padding bits N3 as:

$$N3 = L_{LDPC} \cdot R \cdot \max(0, Ncw' - 1) + \quad \text{Equation 22}$$
$$\text{ceil}\left(\frac{\text{N\_pld}}{L_{LDPC} \cdot R}\right) \cdot L_{LDPC} \cdot R - \text{N\_pld} + 1$$

The MAC padding module updates the following variables: N_CW=N_CW_nopad+ncw_cond, N_pld=N_pld+N3 and overflow=1.

When the condition 0<Ncw' above is false, the MAC padding module sets N3=0 and calculates the overflow parameter as given by:

$$\text{overflow} = \text{N\_pld} - \left[\text{floor}\left(\frac{\text{N\_pld}}{L_{LDPC} \cdot R}\right) \cdot L_{LDPC} \cdot R\right] \quad \text{Equation 23}$$

In an embodiment, N_CW and $L_{LDPC}$ satisfy: N_CW=1 and $L_{LDPC} \leq 1296$, in which case the MAC adding module sets $L_{LDPC}$=1296. Since the combination of $L_{LDPC}$=648 and N_CW=2 is invalid, the MAC padding module calculates overflow and N3 as:

N3=1944·R−N_pld+1 overflow=max[0,1944·R−N_pld−N3+1]      Equation 24:

In Equations 23 and 24, N_CW_nopad is omitted.

Next, the MAC padding module calculates another partial number of padding bits denoted N4, for ensuring that the initial payload N_pld_init does not overflow into the subsequent code word (N_CW_nopad+1) as a result of padding, encoding and applying shortening, puncturing or both. The condition is formulated as:

$$\text{ncw\_cond} \cdot \left(L_{LDPC} \cdot R - \frac{L_{LDPC} \cdot R - \text{overflow} - N4}{\text{N\_CW}}\right) < \quad \text{Equation 25}$$
$$N1 + N2 + N3 + N4$$

and MAC padding module calculates N4 accordingly as given by:

$$N4' = \frac{\text{ncw\_cond} \cdot L_{LDPC} \cdot R \cdot \left(1 - \frac{1}{\text{N\_CW}}\right) + \left(\frac{\text{ncw\_cond} \cdot \text{oveflow}}{\text{N\_CW}}\right) - N1 + N2 + N3}{\left(1 - \frac{\text{ncw\_cond}}{\text{N\_CW}}\right)}$$  Equation 26

$$N4 = \max[0, (N4' + \text{N\_CW})]$$  Equation 27

The additional N_CW bits in Equation 27 are required in cases in which the number of shortening bits is not an integral multiple of N_CW. The total number of padding bits is given by NPAD=N1+N2+N3+N4. The MAC padding module updates the overall payload length:

$$N\_pld = N\_pld + N4$$  Equation 28:

The alternative method described above may violate the processing-time constraint for a 20 MHz channel, MCS0 constellation, Nss7 (Seven spatial streams are multiplexed and transmitted in the Trigger frame, MinTrigProcTime=16 microseconds, and N_pld_init is between 1 and 20 bytes. In this case, the MAC padding module calculates N2 using the expression:

$$N2 = \text{N\_DBPS} \cdot \left[\text{ceil}\left(\frac{MinTrigProcTime}{T\_SYM}\right) + 1\right]$$  Equation 29

Another padding method is described herein. The method is conservative in the sense that it adds padding bits corresponding to a number of two extra OFDM symbols.

The method begins with MAC padding module 64 calculating B_SYM based on the current value of N_pld (Nx+16), and calculates the number of code words N_CW based on the current value of N_pld and on the calculated value of B_SYM. For example, the MAC padding module calculates B_SYM=ceil[N_pld/N_DBPS]·N_DBPS. The MAC padding module then calculates first padding length denoted Npd1 that includes padding corresponding to two extra OFDM symbols given by.

$$Npd1 = \text{ceil}(MinTrigProcTime/T\_SYM+2) \cdot N\_DBPS$$  Equation 30:

The MAC padding module calculates an updated payload length given by:

$$N\_pld' = Nx+16+Npd1$$  Equation 31:

and calculates an updated value B_SYM' based on N_pld', and calculates an updated value N_CW' based on N_pld' and B_SYM'.

The MAC padding module initializes a second padding length denoted Npd2 to a zero value Npd2=0, and possibly modifies Npd2 depending on whether the processing-time constraint comprises 8 or 16 microseconds as follows:

For MinTrigProcTime=8:

if(N_CW'−N_CW<2,Npd2=1944·R)

For MinTrigProcTime=16:

if(N_CW'−N_CW<3,Npd2=2916·R)  Equation 32:

The MAC padding module calculates the overall number of padding bits as:

$$NPAD = Npd1 + Npd2$$  Equation 33:

Next, we describe a method that calculates the required number of padding bits using an iterative process. The iterative process presents a tradeoff between accuracy and convergence time. Searching for the required number of padding bits at high-resolution (up to a single bit resolution) will typically require a higher number of iterations, and vice versa.

Figure 4:
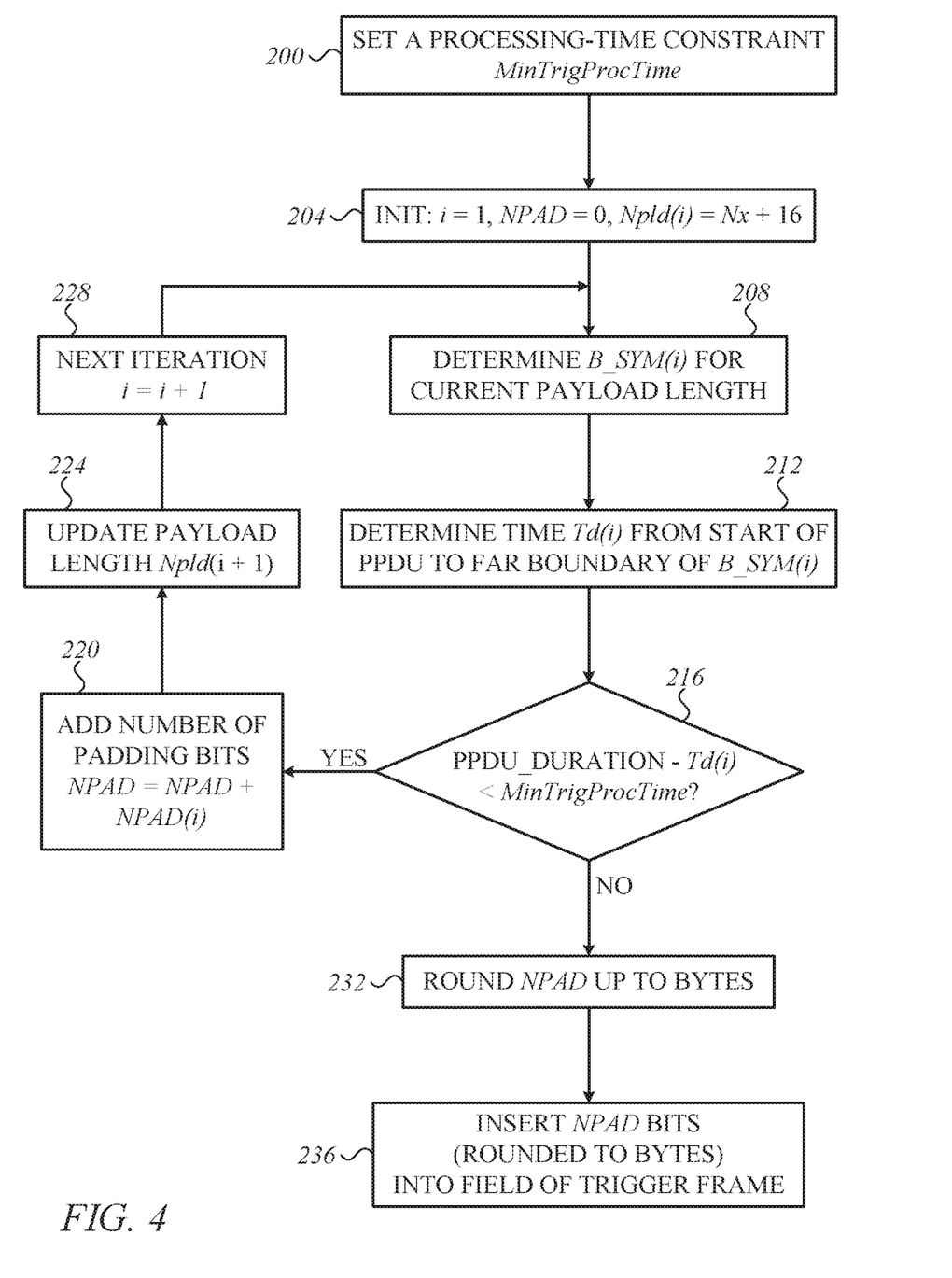
FIG. 4 is a flow chart that schematically illustrate a method for iteratively determining the padding length required in a Trigger frame for meeting a processing-time constraint, in accordance with an embodiment that is described herein.

FIG. 4 is a flow chart that schematically illustrates a method for iteratively determining the padding length required in a Trigger frame for meeting a processing-time constraint, in accordance with an embodiment that is described herein.

The method begins with MAC padding module 64 determining processing-time constraint 60, at a time constraint setting operation 200. Operation 200 essentially similar to operation 100 described above with reference to FIG. 3.

At an initialization operation 204, the MAC padding module initializes various parameters: an iteration index i=1, the number of padding bits NPAD=0, and an initial payload length Npld(i)=Nx+16.

At a symbol location calculation operation 208, the MAC padding module calculates the index B_SYM(i) of OFDM symbol B_SYM (e.g., 80B) for the $i^{th}$ iteration, based on the current payload length Npld(i). For example, the MAC padding module calculates:

$$B\_SYM(i) = \text{ceil}[Npld(i)/N\_DBPS] \cdot N\_DBPS.$$  Equation 34:

At a duration calculation operation 212, the MAC padding module calculates a time duration denoted Td(i) between the the PPDU start point and the time point corresponding to the far boundary of B_SYM. At a time-constraint checking operation 216, the MAC padding module checks whether the processing-time constraint is met, and if not, proceeds to a padding operation 220. At operation 220, the MAC padding module acids to NPAD number NPAD (i)>0 of padding bits, i.e., NPAD=NPAD+NPAD(i). The MAC padding module may select any suitable number of padding bits NPAD(i) to be added in the $i^{th}$ iteration. Typically, by adding large numbers of padding bits in the iterations, the time-constraint may be met with a small number of iterations. In one embodiment, the MAC padding module adds the same number of padding bits each of the iterations. In another embodiment, the MAC module may add different numbers of padding bits in different iterations. In an example embodiment, the MAC padding module adds a number of padding bits given by NPAD(1)=ceil (MinTrigProcTime/T_SYM)·N_DBPS when the condition in operation 216 is true in the first iteration.

At a payload updating operation 224, MAC padding module 64 updates the payload length by calculating Npld (i+1)=Npld(i)+NAPD(i). At an iteration update operation 228, the MAC padding module updates the iteration index i=i+1, and loops back to operation 208 to re-calculate the index of the B_SYM based on the updated payload length.

When the condition at operation 216 is false, the MAC padding module proceeds to a rounding operation 232, at which the MAC padding module rounds the number padding bits NPAD up to bytes, e.g., by calculating NPAD=ceil (NPAD/8)·8, wherein NPAD was accumulated at operation 220 over one or more iterations.

At a padding insertion operation 236, the MAC padding module inserts the (rounded up to bytes) number of bits NPAD of operation 232 into Padding field 66 of MAC Trigger frame 52. Following operation 236, the method terminates.

In the embodiments described above, the processing-time constraint is typically defined in time units such as microseconds. For example, as specified in the IEEE 802.11ax standard, the processing-time constraint has three possible Values, 0, 8 or 16 microseconds. Alternatively, the processing-time constraint may be specified in units of the OFDM symbol duration. For example, in the IEEE 802.11a/n/ac standards, the processing-time constraint may refer to the time duration of 0, 2 or 4 OFDM symbols. In the IEEE 802.ax standard, the processing-time constraint may be provided as zero or one "long" OFDM symbol, or additional padding bits for covering two "short" OFDM segments (increasing the pre-FEC padding factor, a-factor, by 2). In embodiments in which the processing-time constraint is specified in units of OFDM symbols (and/or OFDM segments) denoted MinTrigProcNumSym, the MAC padding module calculates the corresponding partial number of padding bits required as N_DBPS·(MinTrigProcNumSym). Alternatively, the MAC padding calculates N_DBPS·(MinTrigProcNumSym+B), wherein B>0 denotes a number of additional OFDM symbols required in case of encoding with puncturing and/or shortening, e.g., set B as B=2.

In yet other embodiments, the processing-time constraint may be specified directly in terms of the number of padding bits required.

In some embodiments, to ensure sufficient padding for meeting the processing-time constraint, the MAC module supports such padding only for cases in which ECC module 56 is configured to use the BCC scheme.

The embodiments described above are given by way of example, and other suitable embodiments can also be used. For example, the embodiments above are applicable not only to the Trigger frame specified in the IEEE 802.11ax standard, but to other types of frames that include a variable-length padding field. As an example, the embodiments described above are applicable to frames containing a Triggered Response Scheduling (TRS) Control subfield.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Wireless Local-Area Network (WLAN) Access Point (AP), comprising:
a Medium Access Control (MAC) processor, configured to:
generate a trigger frame comprising at least (i) one or more user information fields destined to one or more respective WLAN client stations (STAs), and (ii) a padding field comprising one or more padding bits;
determine a number of padding bits required that, after being inserted into the padding field and the trigger frame being encoded for transmission, satisfy a processing-time constraint imposed by the STAs; and
insert the determined number of padding bits required in the padding field; and a physical layer (PHY) processor, configured to:
generate a packet from the trigger frame, including encoding the trigger frame containing the padding field in accordance with an Error Correction Code (ECC), into one or more Code Words (CWs) having a CW length that depends on a number of padding bits in the padding field, wherein the PHY processor is configured to encode the trigger frame with the ECC by applying a Low-Density Parity-Check (LDPC) code;
generate multiple modulated symbols from the one or more CWs of the packet; and
transmit the modulated symbols to the STAs;
wherein the MAC processor is configured to determine the number of padding bits required based on calculating a first partial number of padding bits required for reaching an end of a CW which encodes a last user information field of the trigger frame; calculating a second partial number of padding bits required for reaching a far boundary of a symbol to which the last encoded bit of the CW that encodes a last user information field is mapped but not reaching the processing time constraint; calculating a third partial number of padding bits required for reaching the processing time constraint after the far boundary of the symbol to which the last encoded bit of the CW that encodes the last user information field is mapped; and summing the first partial number, second partial number, and the third partial number to determine the number of padding bits which reaches the processing constraint;
wherein the first partial number of padding bits, the second partial number of padding bits and the third partial number of padding bits are calculated based on puncturing performed during the LDPC encoding of the trigger frame.

2. The AP according to claim 1, wherein the MAC processor is configured to receive, before generating the trigger frame, multiple processing-time constraint values from one or more respective STAs that participate in a simultaneous uplink transmission to be triggered by the trigger frame, and to determine the number of padding bits required based on a longest value among the multiple received processing-time constraint values.

3. The AP according to claim 2, wherein the MAC processor is configured to adjust one or more of the received processing-time constraint values, before selecting the longest value, based on respective locations of the user information fields of the STAs in the Trigger frame.

4. The AP according to claim 1, wherein the MAC processor is configured to determine the number of padding bits required, by evaluating an expected modification to an encoding scheme applied using the ECC caused by adding the padding bits, wherein the modification changes a length of the trigger frame.

5. The AP according to claim 1, wherein the processing-time constraint is indicative of an additional processing time required by a STA, wherein the MAC processor is configured to determine the first partial number and the second partial number of the padding bits required, independently of the processing-time constraint.

6. The AP according to claim 1, wherein the MAC processor is configured to determine the number of padding bits required using an iterative process that iteratively increases the number of padding bits required until the processing-time constraint is met.

7. The AP according to claim 1, wherein the AP supports a Space-Time Block Coding (STBC) mode of operation, and wherein the MAC processor is configured to determine the number of padding bits required depending on the STBC mode.

8. A method for communication, comprising:

in a Wireless Local-Area Network (WLAN) Access Point (AP) that comprises a Medium Access Control (MAC) processor, and a physical layer (PHY) processor, generating by the MAC processor a trigger frame comprising at least (i) one or more user information fields destined to one or more respective WLAN client stations (STAs) and (ii) a padding field comprising one or more padding bits;

determining by the MAC processor a number of padding bits required that, after being inserted into the padding field and the trigger frame being encoded for transmission, satisfy a processing-time constraint imposed by the STAs, and inserting the determined number of padding bits required in the padding field;

generating a packet from the trigger frame, by the PHY processor, including encoding the trigger frame containing the padding field in accordance with an Error Correction Code (ECC), into one or more Code Words (CWs) having a CW length that depends on a number of padding bits in the padding field, wherein the PHY processor is configured to encode the trigger frame with the ECC by applying a Low-Density Parity-Check (LDPC) code;

generating by the PHY processor multiple modulated symbols from the one or more CWs of the packet; and transmitting the modulated symbols to the STAs, wherein the MAC processor is configured to determine the number of padding bits required based on calculating a first partial number of padding bits required for reaching an end of a CW which encodes a last user information field of the trigger frame; calculating a second partial number of padding bits required for reaching a far boundary of a symbol to which the last encoded bit of the CW that encodes a last user information field are mapped but not reaching the processing time constraint; calculating a third partial number of padding bits required for reaching the processing time constraint after the far boundary of the symbol to which the last encoded bit of the CW that encodes the last user information field is mapped; and summing the first partial number, second partial number, and the third partial number to determine the number of padding bits which reaches the processing constraint;

wherein the first partial number of padding bits, the second partial number of padding bits and the third partial number of padding bits are calculated based on puncturing performed during the LDPC encoding of the trigger frame.

9. The method according to claim 8, and comprising receiving by the MAC processor, before generating the trigger frame, multiple processing-time constraint values from one or more respective STAs that participate in a simultaneous uplink transmission to be triggered by the trigger frame, and determining the number of padding bits required based on a longest value among the multiple received processing-time constraint values.

10. The method to claim 9, wherein each of the STAs has a respective user information field in the Trigger frame, and comprising, adjusting one or more of the received processing-time constraint values, before selecting the longest value, based on respective locations of the user information fields of the STAs in the Trigger frame.

11. The method according to claim 8, wherein determining the number of padding bits required, comprises evaluating an expected modification to an encoding scheme applied using the ECC caused by adding the padding bits, wherein the modification changes a length of the trigger frame.

12. The method according to claim 8, wherein the processing-time constraint is indicative of an additional processing time required by a STA, wherein determining the number of padding bits required comprises determining the first partial number and the second partial number of the padding bits required, independently of the processing-time constraint.

13. The method according to claim 8, wherein determining the number of padding bits required comprises performing an iterative process that iteratively increases the number of padding bits required until the processing-time constraint is met.

14. The method according to claim 8, wherein the AP supports a Space-Time Block Coding (STBC) mode of operation, and wherein determining the number of padding bits required comprises determining the number of padding bits required depending on the STBC mode.

* * * * *